June 27, 1944.    C. F. WALLACE    2,352,578
RADIOMETEOROGRAPH TRANSMITTER
Original Filed Dec. 31, 1941    2 Sheets-Sheet 1
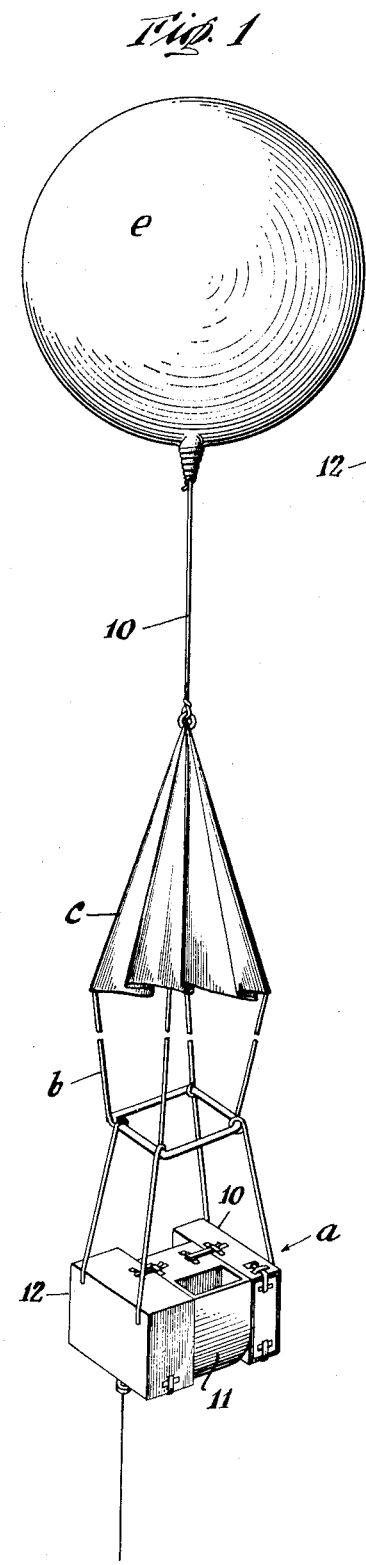
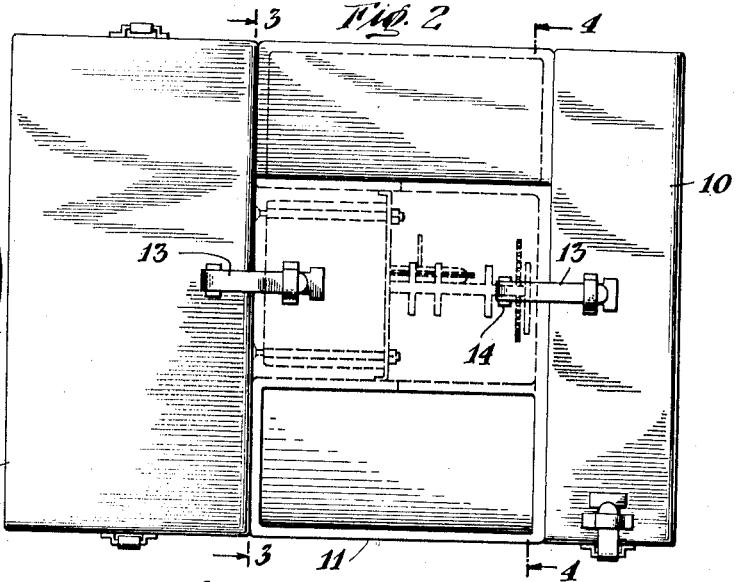
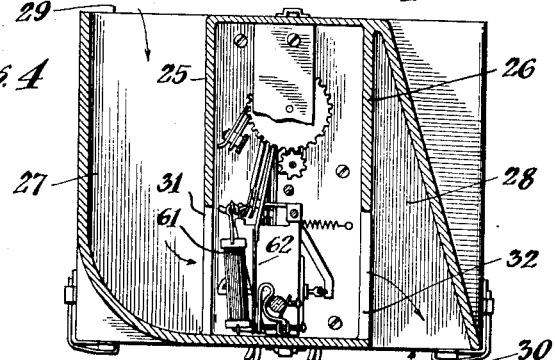
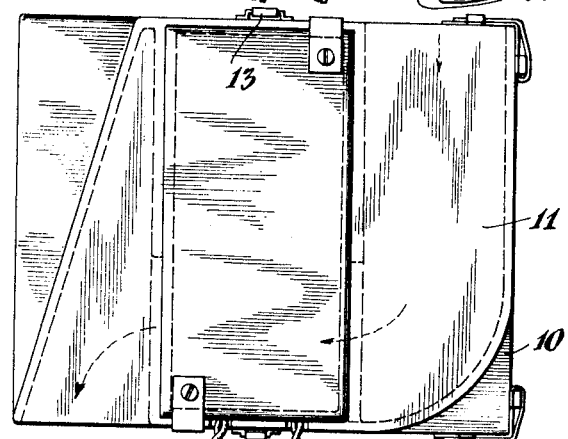
INVENTOR.
Charles F. Wallace
By Arthur A. Kent
his ATTORNEY Patented June 27, 1944

2,352,578

UNITED STATES PATENT OFFICE 2,352,578

RADIOMETEOROGRAPH TRANSMITTER

Charles F. Wallace, Westfield, N. J., assignor to Wallace & Tiernan Products, Inc., Belleville, N. J., a corporation of New Jersey Original application December 31, 1941, Serial No. 425,026. Divided and this application October 8, 1942, Serial No. 461,325

4 Claims. (Cl. 200—136)

This invention relates to radiometeorograph transmitting apparatus, or radiosondes, that is, apparatus for the measurement of meteorological conditions through various levels of the atmosphere and radio transmission of the measurements to a receiver and recorder at a receiving station, and especially to radiometeorograph transmitters of comparatively light weight and, therefore, especially suitable to be carried by small "sounding" balloons either free or captive.

More particularly, the invention relates to means for protectively enclosing the meteorological circuit-controlling instruments of the apparatus while assuring a free flow of air past the temperature- and humidity-sensitive elements of the instruments as the transmitter is carried upward. The object of the invention is to provide improved means for this purpose.

This application is a division of my application Serial No. 425,026, filed December 31, 1941, on which Patent No. 2,347,345, dated April 25, 1944, has been granted.

In the accompanying drawings illustrating an embodiment of the invention in the form now considered best;

Fig. 1 shows the radiometeorograph transmitter as it appears attached to a sounding balloon in flight;

Fig. 2 is a top plan view of the transmitter;

Fig. 3 is a view taken on line 3—3 of Fig. 2 showing one side of the middle container of the complete apparatus, which container houses the driving motor and the meteorological circuit-controlling instruments;

Fig. 4 is a sectional view taken on line 4—4 of Fig. 2; and

Figure 5:
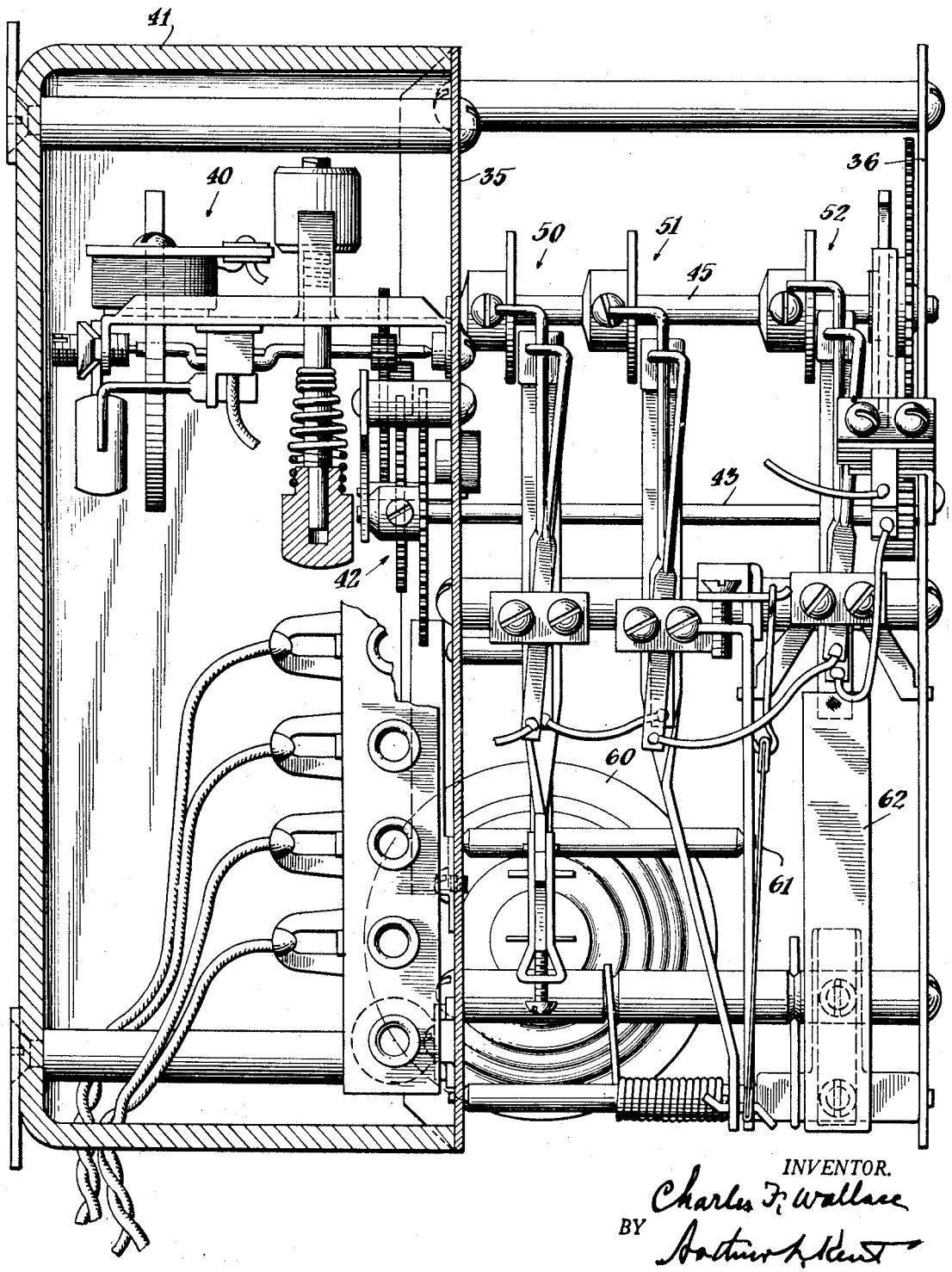
Fig. 5 is an enlarged side view of the circuit controlling devices and the motor with the motor casing shown in section.

Referring to the drawings, Fig. 1 shows the complete radiometeorograph transmitter *a* as it appears in flight suspended by cords *b* from a small parachute *c* which in turn is suspended by cord *d* from a small free balloon *e* inflated to a predetermined degree. The customary swivel connection between the transmitter and the parachute may of course be used.

Figs. 2, 3 and 4 show the complete radiometeorograph transmitter shown in my original application No. 425,026. It comprises three principal parts housed in three separate containers 10, 11 and 12; batteries forming the power source being in container 10; the meteorological transmitter, which controls the circuit to the radio transmitter, comprising the driving motor and the meteorological circuit-controlling instruments, or devices, and the indexing circuit-controlling device, in container 11; and the radio transmitter in container 12; the three containers with their enclosed apparatus parts being assembled and secured together as shown in Fig. 2. Each of the containers 10, 11 and 12 is made of suitable light-weight heat-insulating material, and they are most desirably coated on the outside with a glossy white waterproof paint or made of a suitable light-reflecting material to limit the absorption of heat from the sun's rays. The three containers are secured together, with container 10 on one side and container 12 on the opposite side of container 11, by suitable connecting means adapted to permit ready separation of the containers and ready connection thereof in assembled relation, such as the soft metal tongues 13 extending from the top and bottom of the end containers and passed through and bent back over keepers 14 on the central container. This is the unit type of construction claimed in my co-pending application No. 327,767, filed April 4, 1940.

The central container 11 is, according to the present invention, divided interiorly by partitions 25 and 26 into a middle compartment which is open at one side of the container and in which the meteorological transmitter is housed and two end compartments 27 and 28, the end compartment 27 having an air inlet opening 29 at the top and end compartment 28 having an air outlet opening 30 at the bottom. The partition 25 has an air inlet opening 31 and partition 26 has an air outlet opening 32, these openings being in the lower part of the respective partitions and to one side toward the closed side of the container in line with the temperature-responsive and humidity-responsive elements 62 and 61 of the meteorological instruments. Most desirably, the inlet opening 29 and the passage from it to inlet opening 31 are substantially larger than the opening 31, and the bottom outlet opening 30 and the passage to it from outlet opening 32 are substantially larger than opening 32. There is thus provided a passage for unretarded flow of air from the inlet opening 29 at the top of compartment 27 to the inlet opening 31 to that portion of the middle compartment in which the temperature and humidity elements are located, and from the opening 32 to the outlet opening 30 at the bottom of compartment 28. These elements will thus be continuously laved by an air current flowing through the lower part of the middle compartment while the transmitter is ascending, while the contacts and conductors of the meteorological and indexing devices, which are located in the upper part of the middle compartment, are out of the path of air flow and protected against rain or snow and against direct access of any air-borne moisture, and are also fully shielded from the sun's rays.

By shaping and proportioning the air flow passage in accordance with Figs. 2, 3 and 4, there is obtained a maximum velocity of air flow through the instrument chamber, which results in the pressure and humidity elements indicating substantially the conditions exterior to the casing at a level of ascent corresponding to the position of the radio-meterograph. The pressure differential under which air is moved through the instrument chamber is, because of the relatively large air inlet and outlet passages leading from the top and to the bottom of the casing, greater than it would be if such passages were only as large as the openings into and from the instrument chamber.

Fig. 5 shows the meteorological transmitter of my said original application Serial No. 425,026. The driving motor and the circuit-controlling instruments and their mountings form a structure complete in itself which may be inserted and removed as a unit into and from the middle compartment of container 11. The mounting structure for these apparatus parts comprises a support plate 35 on one side of which the driving motor 40 is mounted, and a plate 36 spaced off from the other side of plate 35 by means of spacing posts extending between the plates, the circuit-controlling instruments being mounted side by side between these two plates. The motor is enclosed by a light weight casing 41 secured to the plate 35. The plate 35 and the casing 41 are of a size to fit through the open side of the middle compartment of container 11 so that when this unitary structure is inserted into said middle compartment it will be steadily positioned therein. The motor drives, through a train of reduction gearing 42, a shaft 43 from which a shaft 45 which carries the cams of the circuit-controlling instruments is driven.

The transmitter shown comprises three meteorological circuit-controlling instruments, or telemetering transmitters; that is, a pressure-responsive instrument 50, a humidity-responsive instrument 51, and a temperature-responsive instrument 52. The contact members of these instruments are operated by cams on the shaft 45. The pressure element, or barometric capsule, 60 of the pressure-responsive instrument, and the humidity-sensitive element 61 of the humidity-responsive instrument, and the temperature-responsive element 62 of the temperature-responsive instrument, which is a thin bi-metallic plate, are all spaced away from the contact members near one end of the space between the plates 35 and 36, the contact members and their operating cams on shaft 45 being near the other end of said space.

The motor and the circuit-controlling instruments of this meteorological transmitter illustrated in Fig. 5 form in themselves no part of the invention to which this divisional application is directed, and, therefore, need not be further described herein. They are fully described in my said original application Serial No. 425,026, and features thereof are claimed in said application and in other divisions of said application. The invention of this application is obviously not limited to the use of a meteorological transmitter such as shown by Fig. 5 or of circuit-controlling instruments such as shown by said figure.

When the meteorological transmitter of Fig. 5 is positioned in the middle compartment of the casing 11 as appears from Figs. 2 and 4, the motor casing 41 fills the part of the compartment toward its open side and the circuit controlling instruments are in the inner portion of the compartment with their sensitive elements in the lower part thereof between the air inlet opening 31 and the outlet opening 32 and their electrical contact members and conducting connections in the upper part of the compartment. The temperature-responsive and humidity-responsive elements of the instruments will thus be directly in the path of the air current which flows through the lower part of the middle compartment during ascent of the transmitter, and the contact members in the upper part of the compartment will be out of the path of the air current and protected against rain or snow or other air-borne moisture and shielded from sun rays.

What is claimed is:

1. A radiometeorograph transmitter, comprising a circuit-controlling instrument having an element responsive to changes in an atmospheric condition, and a container in which said instrument is housed, said instrument being mounted with its contact devices in an upper part of the container and its responsive element in a lower part of the container, and the container being formed to serve as a protective enclosure for said instrument except for air openings in opposite side walls thereof in line with the responsive element, and having on one side a part providing an upwardly opening air intake passage leading to one of said air openings and having on the other side a downwardly opening air discharge passage leading from the other of said openings, whereby as the transmitter ascends a flow of air is maintained past the responsive element of the instrument while the contact members are out of the path of air flow.

2. A radiometeorograph transmitter as claimed in claim 1, in which the air intake passage and the air discharge passage are of substantially greater cross-section than said air openings.

3. A radiometeorograph transmitter, comprising a circuit-controlling instrument having a temperature-responsive element, a circuit-controlling instrument having a humidity-responsive element, and a container in which said instruments are housed, said instruments being mounted with their contact devices in an upper part of the container and their temperature- and humidity-responsive elements in a lower part of the container, and the container being formed to serve as a protective enclosure for said instruments except for air openings in opposite side walls thereof in line with the temperature- and humidity-responsive elements, and having on one side a part providing an upwardly opening air intake passage leading to one of said openings and having on the other side a downwardly opening air discharge passage leading from the other of said air openings, whereby as the transmitter ascends a flow of air is maintained past the temperature- and humidity-responsive elements of the instrument while the contact members are out of the path of air flow.

4. A radiometeorograph transmitter, comprising a circuit-controlling instrument having an element responsive to changes in an atmospheric condition, and a container in which said instrument is housed, the container being divided interiorly by two partitions into a middle compartment forming the container proper and two end compartments, each of the partitions having an opening for the passage of air near the bottom of the container and one of the end compartments having an air inlet opening at the top so that the compartment serves as an air inlet passage to the air opening in the adjacent partition and the other end compartment having an air outlet at the bottom and serving as an outlet passage from the air opening in its adjacent partition, and said instrument being mounted in the middle compartment with its contact devices in an upper part of the compartment above the air openings in the partitions and its responsive element in a lower part of the compartment between said air openings.

CHARLES F. WALLACE.